May 19, 1964
O. P. PIERSON
3,133,797
APPARATUS FOR DEHYDRATING POTATOES
Filed April 24, 1959
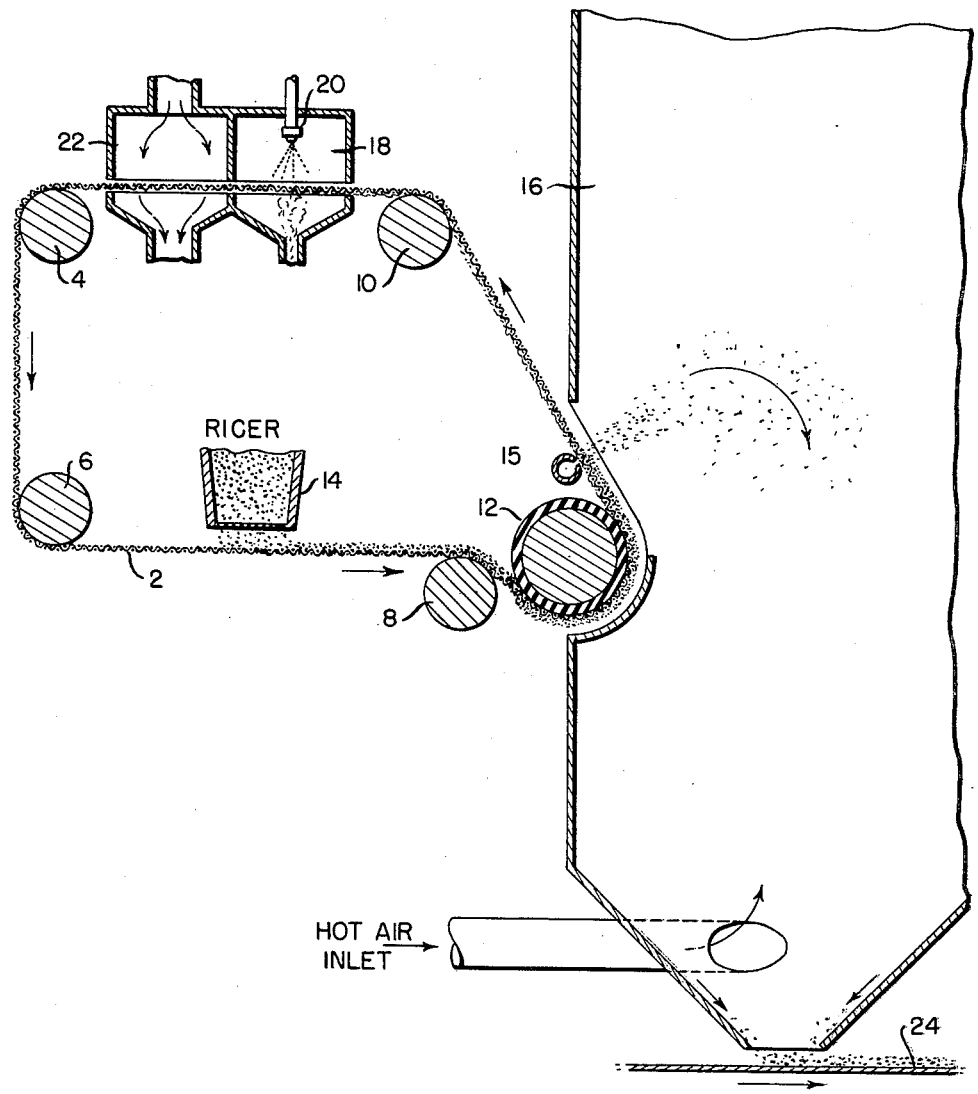
INVENTOR.
OLOF P. PIERSON
BY
ATTORNEYS

United States Patent Office 3,133,797
Patented May 19, 1964

3,133,797
APPARATUS FOR DEHYDRATING POTATOES
Olof P. Pierson, 23 N. Main St., Caribou, Maine
Filed Apr. 24, 1959, Ser. No. 808,615
1 Claim. (Cl. 34—85)

The present invention relates to an apparatus for dehydrating potatoes and similar vegetables.

The dehydration of potatoes has always presented a difficult problem. If the potatoes are too severely handled the dried product upon reconstitution makes a starchy or pasty mass. Prevention of this effect may be accomplished by refrigeration prior to dehydration, but such action is expensive and time-consuming. It has also been proposed to recirculate a part of the powdered product into the mashed potatoes that are to be dehydrated, and while this has been successful in preventing starch conversion, the process is expensive and difficult to control.

Another difficulty arises whenever the potatoes are to be mashed or passed through small screens in that potato fiber tends to build up and clog the apparatus.

The object of the present invention is to provide an apparatus for dehydration of potatoes and like vegetables whereby dehydration may be quickly and economically effected in simple machinery.

With this object in view the principal feature of the present invention comprises a wire mesh belt preferably of stainless steel on which the riced or mashed potatoes are deposited, together with means for forcing them mechanically through the screen, and an air blast which blows through the screen to remove the particles therefrom. The particles are then dehydrated in conventional fashion. The belt is washed and dried to remove any accumulation of fibers and is then passed continuously to position for further reception of the riced potatoes.

The accompanying drawing is a diagrammatic sectional elevation of the preferred apparatus according to the present invention.

As shown in the drawing, a belt 2 is passed continuously over a series of rolls 4, 6, 8 and 10, any one of which may be a driver for the belt. The belt is preferably a stainless steel screen having about a 30 x 30 mesh. At one point the belt passes over a squeezing roll 12, preferably immediately adjacent to one of the other rolls 8, whereby the belt is in intimate contact with the roll 12 for a substantial part of a revolution. The roll 12 is covered with a soft material such as rubber, for a purpose to be described later.

Immediately above the bottom stretch of the belt is a ricer 14 of conventional construction whereby boiled potatoes are forced through openings to deposit the potatoes in divided form on the screen belt 2. The ricer has holes similar to that of the domestic ricer and therefore forms strings or granules of the potatoes. The potatoes are boiled with or without skins and are placed in the ricer which is operated in conventional fashion. The ricer must be cleaned periodically to remove fibers and skins if the latter are left on during the ricing operation.

In passing over the roll 12 the riced potatoes are squeezed through the screen. The rubber covered roll 12 over which the belt passes tightly serves to force the potatoes through the mesh. The potatoes cling to the outer surface of the screen. Accordingly, only a thin coating of material is allowed to accumulate on the screen from the ricer since a large accumulation would tend to cause some of the material to drop off.

After passing the roller 12 the material comes into the region of an air blast generated in a slotted pipe 15 which extends completely across the inside surface of the belt. The blast blows through the screen and transports the particles of mashed potatoes into a dehydrating zone 16 to be described later.

The belt passes over one of the driving rolls 10 into a washing and drying zone. It will be understood that the potato fiber will be retained on the inside of the belt. The fiber includes the eyes of the potatoes and such of the skin as is passed through the ricer, together with some of the natural fiber content of the potato meat. The washer 18 is of simple form and consists of a chamber through which the belt passes to be acted upon by a downwardly directed spray from a spray head 20. Since the fiber has accumulated on the inside of the belt and the spray is directed against the outside, the fiber is readily washed off under the force of a normal spraying operation. The belt then passes through a drying chamber 22 in which a blast of warm air is blown over the belt to remove such moisture as may remain from the washing operation. From that point the belt passes over the rollers indicated at 4 and 6 to come again into the region to receive material from the ricer 14.

The belt preferably operates at a speed of about 50 to 60 feet per minute, and the potatoes are supplied through the ricer at sufficient speed to maintain a suitable thickness thereon as stated above.

The dehydrating apparatus shown at 16 is substantially conventional in form and will be understood by those skilled in the art without a detailed description. A current of warm air flows upwardly through the dehydrator 16 while the potato particles blown off by the blast 14 fall through the chamber counter-current to the air. If a single pass through the dehydrator is found to be insufficient they may be conveyed to a finish dryer by means of a conveyor 24 on which the dehydrator 16 discharges. Preferably the air current in the dehydrator 16 is a temperature of about 240°.

The resulting product is a mixture of fine powder and granules. If desired, the mixture may be screened to separate the powder from the granules. Either the powder or the granules, or the mixture of both, is a satisfactory material which may be reconstituted with water to form a palatable mashed potato product. It has been found that the product does not become starchy or pasty, but has the desired characteristics of mashed or whipped potatoes. The advantages are believed to be due to the relatively gentle handling by the soft roll 12 and the air blast 14, as distinguished from severe agitation which tends to cause a breakdown of the starch.

The apparatus is simple and inexpensive as is necessary with a low cost product such as potatoes. One of the principal advantages is that the fiber does not build up but is continuously washed off the screen at 18. Some accumulation of fiber may occur in the ricer 14, but because of the relatively large openings in the ricer, it is readily cleaned.

Having thus described the invention, I claim:

Apparatus for dehydrating potatoes or like vegetables comprising a continuously moving belt constructed of wire mesh, means for depositing on the belt a thin layer in divided form of vegetable material containing edible portions and fiber portions, a squeezing roller over which the belt passes to force edible portions of the vegetable material through the belt to expose said portions and cause them to adhere to the belt on the side opposite from the squeezing roller while fiber portions adhere to the belt on the same side as the roller, air blast means on the same side of the belt as the roller to blow through the belt to remove the material which has been forced through the belt without removing the material which has not been forced through the belt, a dehydrating chamber into which the particles removed from the belt by the air blast are passed, and cleaning means adjacent to the belt and arranged to direct cleaning fluid against the belt in a direction opposite to the air blast in order to remove fiber portions from the belt.

References Cited in the file of this patent

UNITED STATES PATENTS

| | | |
|---|---|---|
| 1,025,373 | Cooke | May 7, 1912 |
| 1,250,427 | Campbell | Dec. 18, 1917 |
| 1,258,047 | Remmers | Mar. 5, 1918 |
| 1,443,367 | Kennedy | Jan. 30, 1923 |
| 2,168,419 | Paterson | Aug. 8, 1939 |
| 2,346,500 | Moore | Apr. 11, 1944 |
| 2,523,552 | Birdseye | Sept. 26, 1950 |
| 2,745,194 | Lowe et al. | May 15, 1956 |
| 2,788,732 | Templeton | Apr. 16, 1957 |
| 2,870,481 | Bonnafoux | Jan. 27, 1959 |